(12) United States Patent
Haslup, Sr.

(10) Patent No.: US 8,240,683 B1
(45) Date of Patent: Aug. 14, 2012

(54) PORTABLE HAND TRUCK WITH POWERED LIFTING DEVICE

(76) Inventor: Joseph L. Haslup, Sr., Toccoa, GA (US)

( * ) Notice: Subject to any disclaimer, the term of this patent is extended or adjusted under 35 U.S.C. 154(b) by 661 days.

(21) Appl. No.: 12/008,228

(22) Filed: Jan. 9, 2008

(51) Int. Cl.
*B62B 1/06* (2006.01)

(52) U.S. Cl. ............. 280/47.29; 280/47.27; 280/47.24

(58) Field of Classification Search .......... 280/47.23, 280/47.24, 47.27–47.29
See application file for complete search history.

(56) References Cited

U.S. PATENT DOCUMENTS

| | | | | |
|---|---|---|---|---|
| 679,621 | A * | 7/1901 | Hulburd | 280/47.27 |
| 1,799,307 | A * | 4/1931 | Manley | 187/232 |
| 1,908,618 | A * | 5/1933 | Watson et al. | 280/47.27 |
| D145,447 | S * | 8/1946 | Johann | D34/26 |
| 2,804,979 | A * | 9/1957 | Lassiter | 212/301 |
| 2,922,658 | A * | 1/1960 | Manahan | 280/47.29 |
| 3,876,039 | A * | 4/1975 | Bushnell, Jr. | 187/226 |
| 3,927,898 | A * | 12/1975 | Weyrauch | 280/47.27 |
| 4,049,083 | A | 9/1977 | Garvey | |
| 4,183,423 | A * | 1/1980 | Lewis | 182/103 |
| D257,246 | S | 10/1980 | Hihara | |
| 4,388,037 | A * | 6/1983 | Suarez | 414/607 |
| 4,613,272 | A * | 9/1986 | vom Braucke et al. | 414/347 |
| 4,752,173 | A | 6/1988 | Fleming | |
| 4,905,849 | A * | 3/1990 | Coull | 212/281 |
| 4,934,659 | A * | 6/1990 | Yoke | 254/326 |
| 5,017,080 | A * | 5/1991 | Thorndike et al. | 414/454 |
| 5,029,884 | A * | 7/1991 | Maendel | 280/47.27 |
| 5,390,943 | A * | 2/1995 | Hedrick | 280/47.24 |
| 5,465,987 | A * | 11/1995 | DellaVecchia | 280/47.28 |
| 5,662,451 | A * | 9/1997 | Muzzi et al. | 414/540 |
| 5,967,734 | A * | 10/1999 | Liu | 414/490 |
| 5,975,826 | A | 11/1999 | Scholder | |
| 5,993,134 | A | 11/1999 | Williamson | |
| D429,051 | S * | 8/2000 | Porter | D34/33 |
| 6,126,183 | A * | 10/2000 | Lensing | 280/47.29 |
| 6,309,168 | B1 | 10/2001 | Holmes | |
| 6,371,449 | B1 * | 4/2002 | Chamberlain | 254/387 |
| 6,481,694 | B2 * | 11/2002 | Kozak | 254/325 |
| 6,530,740 | B2 | 3/2003 | Kim | |
| 6,557,869 | B2 | 5/2003 | Gillette et al. | |
| 6,599,078 | B1 * | 7/2003 | Elder | 414/542 |
| 6,921,095 | B2 | 7/2005 | Middleby | |
| 6,945,742 | B2 * | 9/2005 | Roberts | 414/449 |
| 7,604,450 | B1 * | 10/2009 | Calvery | 414/462 |
| 7,712,582 | B2 * | 5/2010 | Burton et al. | 187/238 |
| 2004/0022615 | A1 * | 2/2004 | Land | 414/630 |
| 2007/0216115 | A1 * | 9/2007 | Warner | 280/47.27 |

* cited by examiner

*Primary Examiner* — J. Allen Shriver, II
*Assistant Examiner* — Travis Coolman
(74) *Attorney, Agent, or Firm* — Montgomery Patent & Design, LLC; Robert C. Montgomery; Joseph T. Yaksich

(57) ABSTRACT

The invention as presently conceived discloses an apparatus that combines the maneuverability of a heavy-duty two-wheel hand truck with an integral battery-powered lifting system. The base of the sliding frame has two outriggers for enhanced stability. The apparatus is provided with a lifting platform similar to a forklift. The lifting force is provided by a winch which retracts or extends a stainless steel cable with a distal hook. Such an arrangement is capable of lifting thousands of pounds. The winch is powered by an on-board 12 volt deep cycle battery. A control panel is situated on the rear of the hand truck for battery power operation. The apparatus can be used to raise loads slightly for transport in a conventional hand truck manner; or alternatively, the apparatus can be used to lift larger equipment including small vehicles.

6 Claims, 4 Drawing Sheets

PORTABLE HAND TRUCK WITH POWERED LIFTING DEVICE

RELATED APPLICATIONS

The present invention was first described in and claims the benefit of Disclosure Document No. 608,323 on Nov. 2, 2006.

FIELD OF THE INVENTION

A hand truck with electric controls for a sliding lift assembly activated with a force is provided by a winch which retracts or extends a stainless steel cable and powered by an on-board 12 volt deep cycle battery.

BACKGROUND OF THE INVENTION

The usefulness of a hand truck is limited to the physical strength of the user. The common hand truck is a very useful piece of equipment that receives almost constant use daily around the world. It is used to transport smaller items ranging from small boxes to refrigerator sized devices with ease. A single person, balancing the load over an axle supported by two (2) wheels can quickly and easily move large and/or heavy items. While a hand truck is very versatile at lifting loads, it can only do so for a distance of a few inches, and is also limited by the physical strength of its user. Accordingly, there exists a need for a means by which heavier loads can be lifted greater distances using the common hand truck as a starting point.

U.S. Pat. No. D 257,246 issued to Hihara discloses a hand truck for lifting and transporting a tire wheel. This design patent does not appear to disclose a design similar to the disclosed invention nor does it appear to possess a reversible winch and power capabilities.

U.S. Pat. No. 6,921,095 issued to Middleby discloses a hand trolley with a winch-operated lifting carriage. This patent does not appear to disclose a hand truck possessing a reversible winch and power capabilities.

U.S. Pat. No. 6,557,869 issued to Gilette, et al. discloses a hand truck. This patent does not appear to disclose a hand truck possessing a reversible winch and power capabilities.

U.S. Pat. No. 6,530,740 issued to Yu and Dong-han discloses a hand truck with electrically operated lifting platform. This patent does not appear to disclose a hand truck possessing a reversible winch that possesses lifting capabilities using a power operated cable.

U.S. Pat. No. 6,309,168 issued to Holmes discloses a attachable lift for a hand truck. This patent does not appear to disclose an apparatus that has a self contained reversible winch and mounted battery supply that lifts objects using a cable hoist.

U.S. Pat. No. 5,993,134 issued to Williamson discloses a hand truck with a load lifting mechanism. This patent does not appear to disclose an apparatus that has a self contained reversible winch and mounted battery supply that lifts objects using a cable hoist.

U.S. Pat. No. 5,975,826 issued to Scholder discloses a hand-truck with attachments. This patent does not appear to disclose an apparatus that possesses a battery powered, self contained reversible winch that is capable of lifting objects using a cable hoist.

U.S. Pat. No. 4,752,173 issued to Fleming discloses a hand truck apparatus for lifting as well as transporting loads, such as solid core doors, and method of installing a door. This patent does not appear to disclose an apparatus that possesses a battery powered, self contained reversible winch that is capable of lifting objects using a cable hoist.

U.S. Pat. No. 4,049,083 issued to Garvey discloses a electrically powered hand truck with stacker attachment. This patent does not appear to disclose an apparatus that has a battery powered, self contained reversible winch that is capable of lifting objects using a cable hoist.

SUMMARY OF THE INVENTION

In view of the foregoing disadvantages inherent in the prior art, it has been observed that there is need for a hand truck based lifting apparatus that can be used in a simple and effortless manner with a minimal amount of training.

The hand truck based lifting apparatus is comprised of a hand truck frame, a handle assembly, lifting cable, pulleys, reversible electric winch and a wheel system.

The hand truck based lifting apparatus hand truck frame is constructed of any sturdy and durable material capable of supporting the object being lifted.

The hand truck based lifting apparatus is capable of being transported to any physical location for use.

The hand truck based lifting apparatus possesses large diameter wheels on its wheel system which permits the apparatus to be transported over rough grade surfaces.

The hand truck based lifting apparatus possesses a bottom plate which further possesses a first and second outrigger assembly to provide increased vertical stabilization to the apparatus.

The hand truck based lifting apparatus outrigger assemblies possess retractable members which can be slid back into the outrigger assembly as needed.

The hand truck based lifting apparatus possesses a center support shaft that provides structural support during the lifting process.

The hand truck based lifting apparatus possesses a bottom carrier plate with a large footprint that permits use of the apparatus on loosely compacted surfaces.

The hand truck based lifting apparatus possesses a top and a positioning pulley that permit the lifting cable to remain vertical and plumb reducing the chance that the apparatus will tip when in use.

The hand truck based lifting apparatus possesses a lifting hook at one end of the lifting cable capable of grasping onto virtually any object requiring lifting, such as but not limited to golf carts, fork trucks, electric carts, ATV's and even smaller motor vehicles.

The hand truck based lifting apparatus lifting cable terminates at its opposite end at a reversible electric winch.

The hand truck based lifting apparatus possesses a reversible electric winch comprising a drum assembly, a motor, a battery and a local control switch.

The hand truck based lifting apparatus local control switch provides control over the upward/downward movement of the lifting cable.

The hand truck based lifting apparatus may also be remotely controlled via an umbilical cord to enhance safety and permit increased visibility to the operator of the apparatus' performance.

The hand truck based lifting apparatus remote control switch is composed of a rechargeable battery such as but not limited to lead acid, nickel-cadmium and lithium ion.

The hand truck lifting apparatus lifting height is governed by the height of the center support shaft.

The hand truck based lifting apparatus possesses a low center of gravity with most of the weight being concentrated in the area of the battery.

The hand truck based lifting apparatus possesses a angled wheel support frame to permit easy transportation of the apparatus.

The hand truck based lifting apparatus is powered by an attached battery with an over-current protection device such as a fuse.

The hand truck based lifting apparatus can be controlled by either the local control switch or the remote control switch.

The prior art appears to disclose apparatuses which operate as handcarts and some that possess lifting platforms. The prior art does not appear to disclose an apparatus that possesses a battery powered, self contained reversible winch that is capable of lifting objects using a cable hoist.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | hand truck based lifting apparatus |
| 20 | handle assembly |
| 25 | wheel system |
| 30 | bottom carrier plate |
| 35 | first outrigger assembly |
| 40 | second outrigger assembly |
| 45 | first retractable member |
| 50 | second retractable member |
| 55 | center support shaft |
| 60 | top pulley |
| 65 | lifting cable |
| 70 | positioning pulley |
| 75 | lifting hook |
| 82 | object requiring lifting |
| 85 | reversible electric winch |
| 90 | drum assembly |
| 95 | motor |
| 100 | battery |
| 105 | local control switch |
| 110 | remote control switch |
| 115 | umbilical cord |
| 120 | angled wheel support frame |
| 125 | over-current protective device |
| 130 | raise relay |
| 135 | lower relay |
| 140 | local raise pushbutton |
| 145 | raise relay coil |
| 150 | local lower pushbutton |
| 155 | lower relay coil |
| 160 | remote raise pushbutton |
| 165 | remote lower pushbutton |
| 170 | high power relay contacts |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
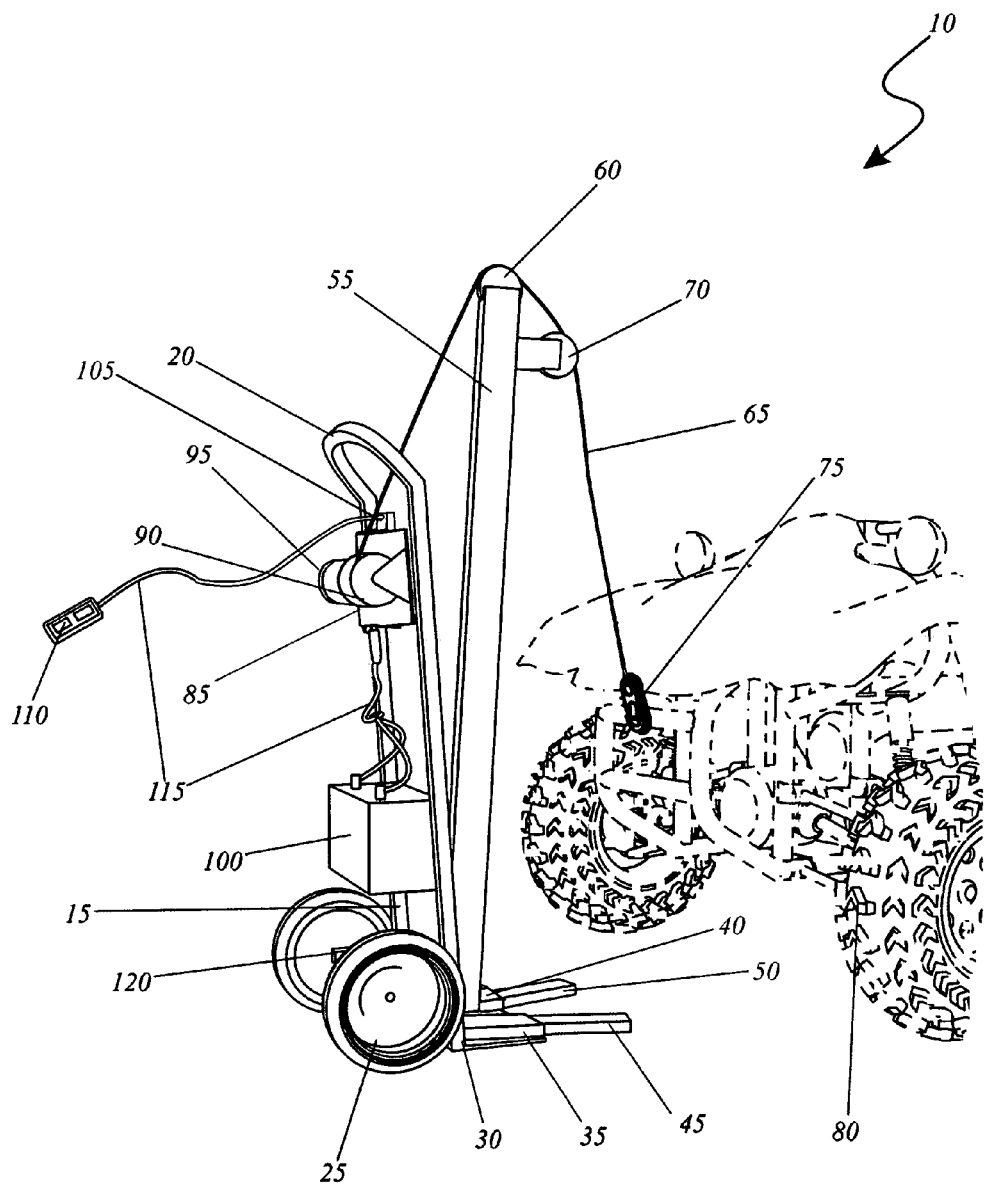
FIG. 1 is an overall perspective diagram of the hand truck based lifting apparatus 10, shown in a utilized state, according to the preferred embodiment of the present invention.

Referring now to FIG. 1, an overall perspective diagram of the hand truck based lifting apparatus 10, shown in a utilized state, according to the preferred embodiment of the present invention is disclosed. The hand truck based lifting apparatus 10 is composed of a hand truck frame 15 along with a handle assembly 20 and a wheel system 25. In such a manner, the common user can move the hand truck based lifting apparatus 10 to any physical location it services are required by simply using the handle assembly 20 and the wheel system 25 in a common and well-known manner. The large diameter nature of the wheel system 25 allows usage of the hand truck based lifting apparatus 10 over outside rough grade surfaces. As would typically be expected on a hand truck, a bottom carrier plate 30 is also provided. The bottom carrier plate 30 is equipped with a first outrigger assembly 35 and a second outrigger assembly 40 to provide increased and adequate vertical stabilization while performing lifting duties as will be described in greater detail herein below. The first outrigger assembly 35 and the second outrigger assembly 40 are equipped with a first retractable member 45 and a second retractable member 50 respectively, shown here in their extended state for purposes of illustration. Each said retractable member can be simply slid back into its respective outrigger assembly for purposes of moving, transport, general hand truck duties, or simply when the features of the first retractable member 45 and the second retractable member 50 are not required. A center support shaft 55 is positioned in a vertical manner along the center axis of the hand truck based lifting apparatus 10, with is bottom most point resting upon the bottom carrier plate 30. Such positioning provides structural support for the center support shaft 55, as the majority of the physical forces associated with the lifting process will be born by the center support shaft 55 and the bottom carrier plate 30. The large footprint nature of the bottom carrier plate 30 allows distribution of these forces over a large area of grade, thus making use of the hand truck based lifting apparatus 10 on loose or un-compacted soil acceptable. The top of the center support shaft 55 is provided with a top, pulley 60, which is used to route a lifting cable 65 into a downward direction. The lifting cable 65 would be made of multiple strands of steel that is well-known in the art, rated and suitable for lifting weights associated with the usage of the hand truck based lifting apparatus 10. A positioning pulley 70 is provided directly below the top pulley 60 and is used to relocate the travel path of the lifting cable 65 outward from that exiting the top pulley 60. In such a manner, the vertical path of the lifting cable 65 as it extends downward is completely vertical and plumb. Said feature is important to permit lifted loads to remain centered against the lifting axis of the center support shaft 55 thus increasing safety and eliminating the possibility of the hand truck based lifting apparatus 10 tipping over during use. The lowermost end of the lifting cable 65 is equipped with a lifting hook 75 which is designed to grasp onto almost any type of object requiring lifting 80. The object requiring lifting 80 depicted here is a golf cart type vehicle, but other items such as fork trucks, electric carts, ATV's and even smaller motor vehicles are envisioned as possible object requiring lifting 80 and thus should not be interpreted as a limiting factor of the present invention. The opposite end of the lifting cable 65 terminates at a reversible electric winch 85. The reversible electric winch 85 is well-known in the art and is typically used on the bumper area of a motor vehicle to aid in traversing hills, rocky areas and the like along with pulling the equipped vehicle or other vehicles from mud, snow or other movement inhibitors. The reversible electric winch 85 consists of a drum assembly 90 and a motor 95. The motor 95 is electrically connected to a battery 100 through a local control switch 105. The local control switch 105 provides up and down control over the motor 95 and the associated lifting hook 75. Additionally, the functionality of the local control switch 105 is duplicated on a remote control switch 110 as connected via an umbilical cord 115. In such a manner, the user may utilize the remote control switch 110 to operate the hand truck based lifting apparatus 10 from a remote physical position for either the purposes of safety and/or increased visibility of the lifting and/or lowering process. Further description and operation of the electrical components associated with the hand truck based lifting apparatus 10 will be described in greater detail herein below. The remote control switch 110 is envisioned to be of rechargeable lead acid design, although other technologies such as nickel-cadmium, lithium ion, along with future developing portable power technologies are also possible, and as such, should not be interpreted as a limiting factor of the present invention.

Figure 2:
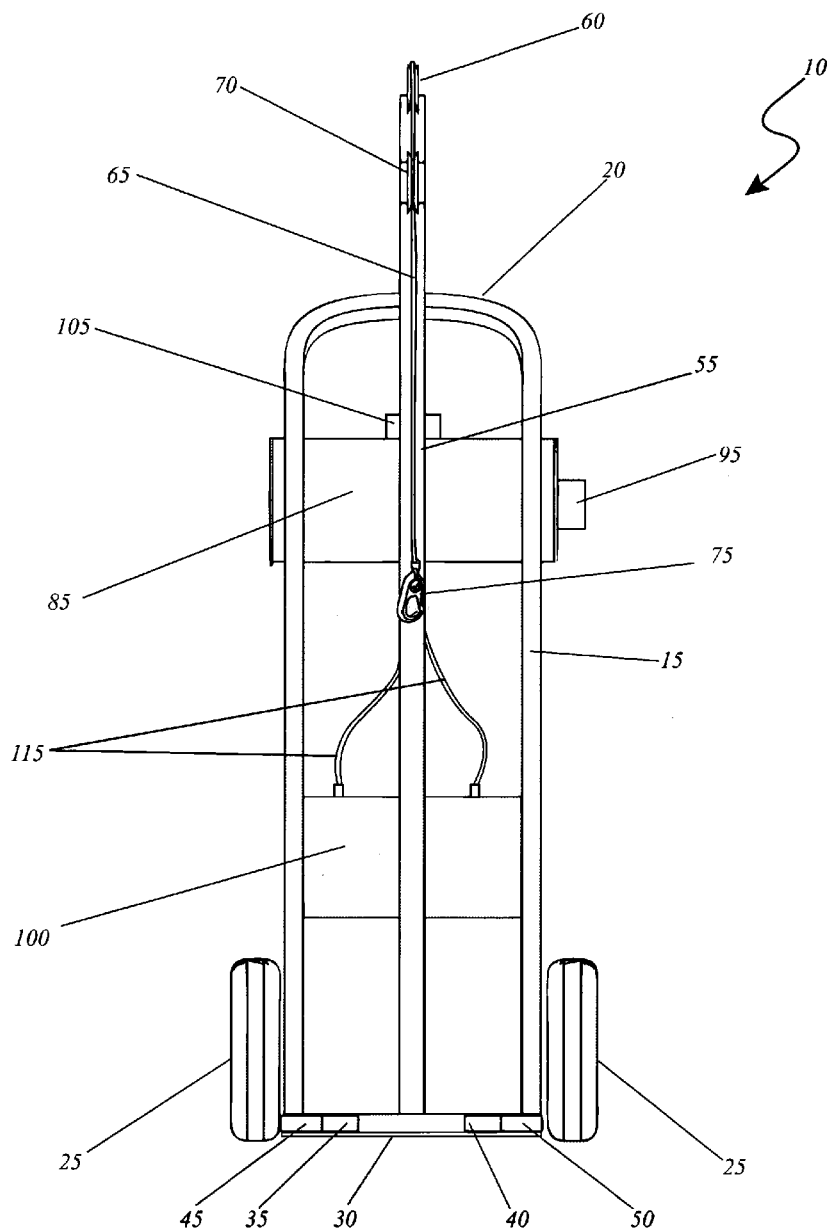
FIG. 2 is a detailed front view of the hand truck based lifting apparatus 10.

Referring next to FIG. 2, a detailed front view of the hand truck based lifting apparatus 10 is depicted. This FIG more clearly depicts the relationship between the hand truck frame 15 and the positioning of the center support shaft 55. This view clearly shows the importance of keeping the center of gravity of the lifting point as close as possible to the center vertical axis of the center support shaft 55. Any minor modifications to the alignment towards the direction of the object requiring lifting 80, (or towards the viewer) (as shown in FIG. 1) would be compensated by the first retractable member 45 and second retractable member 50 along with the first outrigger assembly 35 and second outrigger assembly 40 respectively. Any minor modification to the alignment to either the left or right must be compensated by the bottom carrier plate 30 itself, and due to its small longitudinal nature, they must be kept to a minimum. The overall lifting height of the hand truck based lifting apparatus 10 is governed by the height of the center support shaft 55. While safety must be the prime overriding concern of the lifting process especially when large masses are involved, the height is not intended to be a limiting factor of the present invention. For the purposes of lifting golf carts, fork trucks, electric carts, ATV's and small motor vehicles, a lift height of 24 inches and an overall center support shaft 55 length of 48 inches is envisioned as being commonplace.

Figure 3:
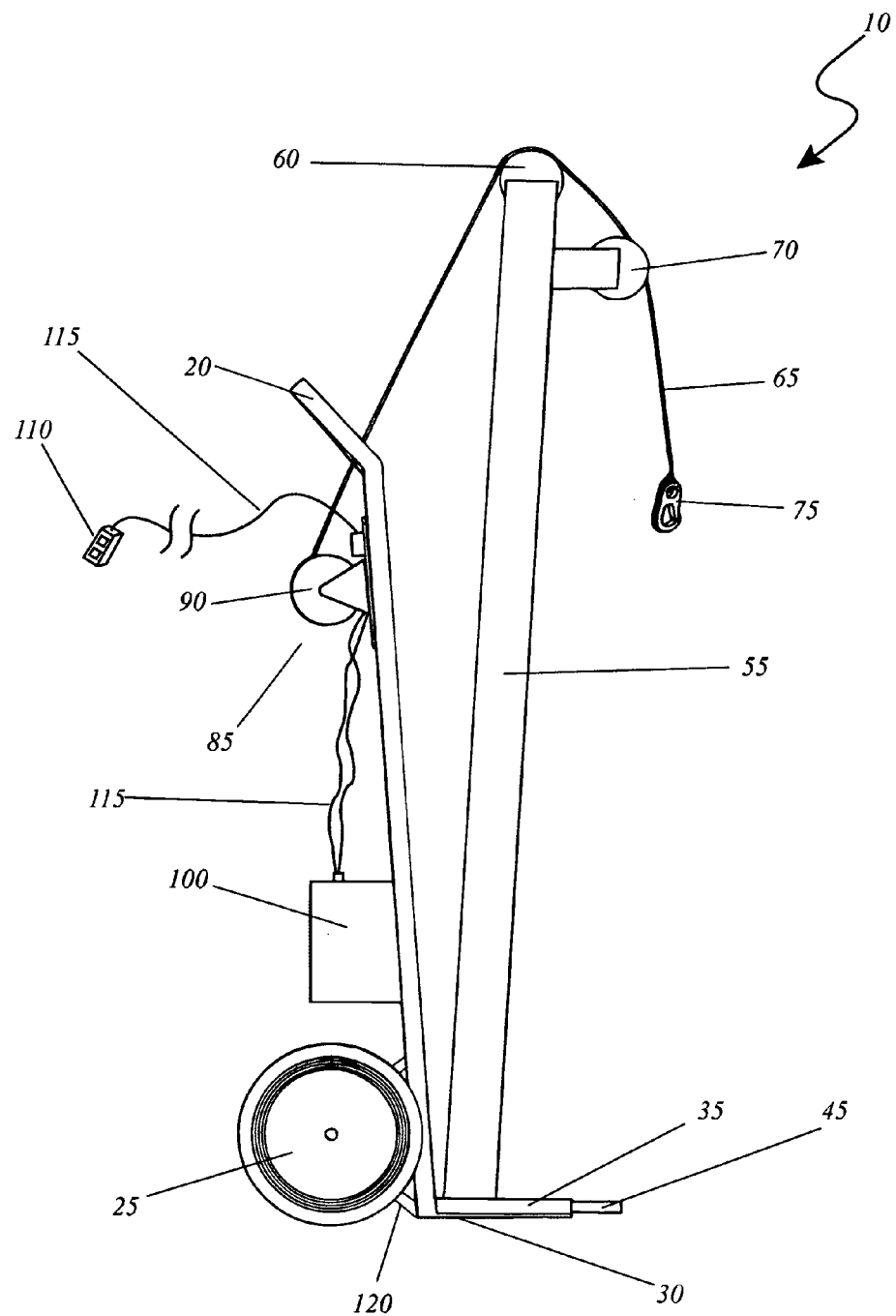
FIG. 3 is a detailed side view of the hand truck based lifting apparatus 10; and, FIG. 4 is an electrical block schematic diagram, which depicts the electrical components as used in the hand truck based lifting apparatus 10.

Referring now to FIG. 3, a detailed side view of the hand truck based lifting apparatus 10 is shown. This FIG. more clearly shows the relationship of the wheel system 25 to the bottom carrier plate 30 and the center support shaft 55. The wheel system 25 is supported by a angled wheel support frame 120 which serves to allow for easy transportation of the hand truck based lifting apparatus 10 from location to location, but remains isolated from the surrounding ground during use. The overall center of gravity of the hand truck based lifting apparatus 10 is fairly low, with the maximum weight being concentrated in the area of the battery 100.

Figure 4:
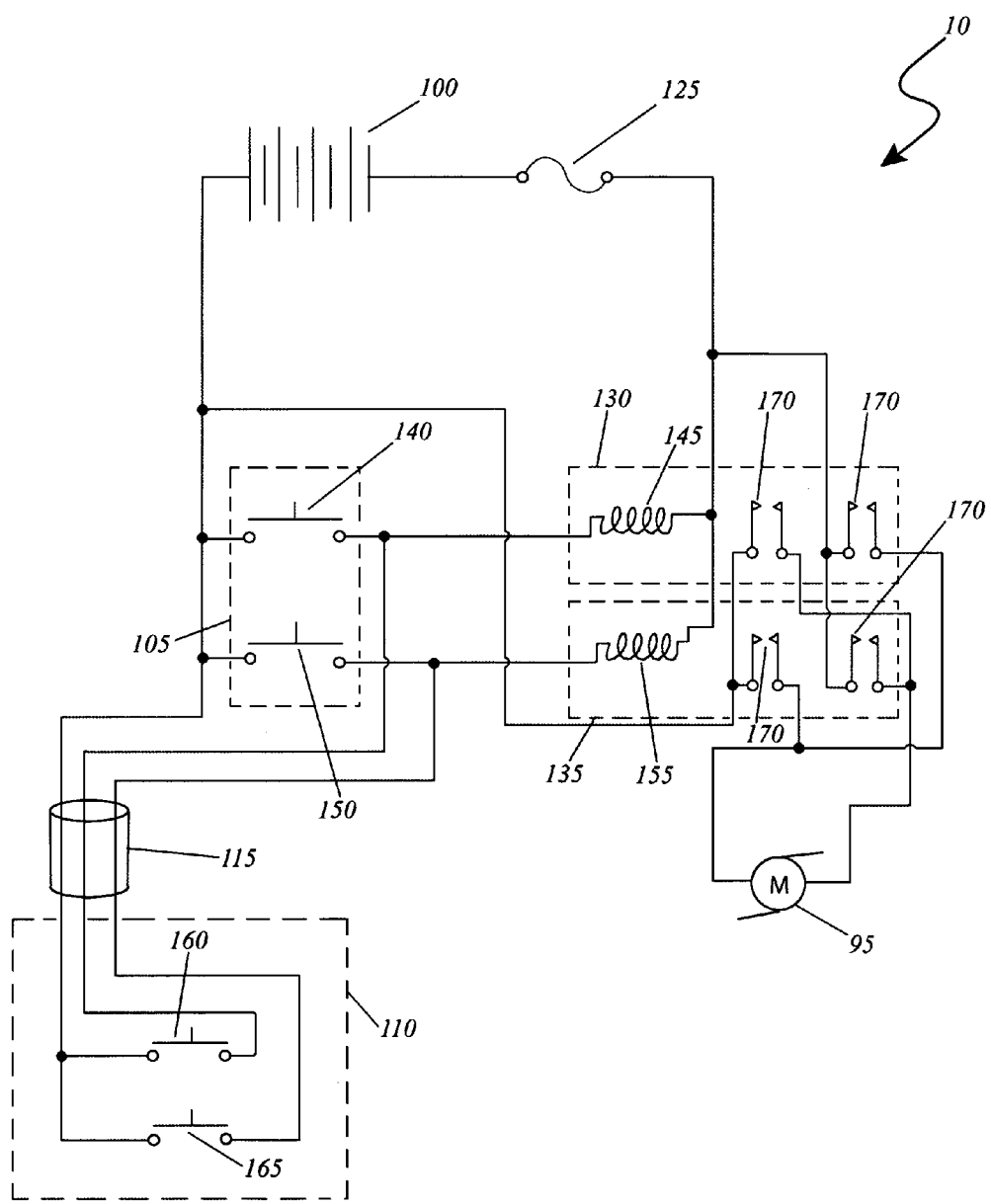

Referring finally now to FIG. 4, an electrical block schematic diagram which depicts the electrical components as used in the hand truck based lifting apparatus 10 is disclosed. Electrical power from the battery 100 is routed through an over-current protective device 125 such as a fuse. The power is then routed to a raise relay 130 and a lower relay 135. The raise relay 130 and the lower relay 135 control the high current loads of the motor 95 and allow for lower control currents through the local control switch 105 and the remote control switch 110 respectively. A local raise pushbutton 140 controls the application of power to a raise relay coil 145, while a local lower pushbutton 150 controls the application of power to a lower relay coil 155 in a similar manner. A remote raise pushbutton 160 in the remote control switch 110 is routed through the umbilical cord 115 where it connects to the local raise pushbutton 140 in a parallel arrangement. A remote lower pushbutton 165 in the remote control switch 110 is routed through the umbilical cord 115 where it connects to the local lower pushbutton 150 in a likewise parallel arrangement. In such a manner, either the local control switch 105 or the remote control switch 110 can control the hand truck based lifting apparatus 10 in an identical manner. High current power is then routed through a series of complimentary high power relay contacts 170 that allow for the reversing of the power application dependent upon which relay is closed. Such an arrangement is well-known in the art and could also incorporate sealing contacts, isolation contacts and the like.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. The common hand truck is a very useful piece of equipment that receives almost constant use daily around the world. It is used to transport smaller items ranging from small boxes to refrigerator sized devices with ease. A single person, balancing the load over an axle supported by two wheels can quickly and easily move large and/or heavy items. While a hand truck is very versatile at lifting loads, it can only do so for a distance of a few inches, and is also limited by the physical strength of its user. Accordingly, there exists a need for a means by which heavier loads can be lifted greater distances using the common hand truck as a starting point. The development of the present invention fulfills this need.

It is envisioned that the hand truck based lifting apparatus 10 would be manufactured and/or assembled in general accordance with FIG. 1. The final user would ensure that the battery 100 is properly charged and in position as shown. At this point, the hand truck based lifting apparatus 10 is ready for use.

To use the hand truck based lifting apparatus 10, the user would wheel it into position using the handle assembly 20 and wheel system 25 as depicted in FIG. 1. The first retractable member 45 would then be pulled out of the first outrigger assembly 35, and the second retractable member 50 would be pulled from second outrigger assembly 40 for safety and stability. Adequate slack on the lifting cable 65 would be provided by pressing the local lower pushbutton 150 on the local control switch 105, or the remote lower pushbutton 165 on the remote control switch 110. At this point, the user would position the lifting hook 75 at a suitable point upon the object requiring lifting 80. Next, the user would remove slack from the lifting cable 65 by pressing the local raise pushbutton 140 on the local control switch 105 or the remote raise pushbutton 160 on the remote control switch 110. Once all slack is removed, the user would verify stability and safety and continue with the lifting or raising process.

After the work is done, the user would lower the object requiring lifting 80 by pressing the local lower pushbutton 150 on the local control switch 105, or the remote lower pushbutton 165 on the remote control switch 110. At this point, the user can remove the lifting hook 75 and store the hand truck based lifting apparatus 10 until needed again.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A hand truck lifting apparatus for transporting an object between remote locations, said hand truck lifting apparatus comprising:
    a single and unitary frame having a bottom carrier plate;
    a wheel system rotatably coupled to said frame and disposed adjacent to said carrier plate;
    means for lifting the object above a support surface, said means for lifting being disposed on anterior and posterior sides of said frame;
    means for vertically stabilizing a position of said frame while performing lifting duties; and,
    means for distributing power to first and second controllers such that either one of said first and second controllers operates said means for lifting;
    wherein said means for lifting is directly attached to said frame;
    wherein said means for lifting comprises:
        a central support shaft positioned in a vertical manner along a center axis of said frame, said central support shaft resting on said carrier plate;
        a top pulley coupled to a top of said central support shaft;
        a lifting cable mounted to said top pulley an extending downwardly therefrom;
        a positioning pulley disposed below said top pulley and supported by said central support shaft in such a manner that said lifting cable is directed outwardly from said top pulley so that a vertical path portion of said lifting cable is vertically plumb; and,
        a hook connected to a lowermost end of said lifting cable;
    wherein said central support shaft has a single and unitary rectilinear body provided with axially opposed top most and bottom most ends respectively;
    wherein said central support shaft further has a uniform cross-section extending along an entire longitudinal length of said rectilinear body;
    wherein said bottom most end of said central support shaft is connected to said carrier plate;
    wherein said frame diverges upwardly and away from said central support shaft; and,
    wherein said bottom carrier plate and said bottom most end of said central support shaft are prohibited from being vertically raised and lowered relative to a longitudinal length of said frame.

2. The hand truck lifting apparatus of claim 1, wherein said vertically stabilizing means comprises: first and second outrigger assemblies attached to said carrier and disposed thereon, wherein said first and second outrigger assemblies are equipped with a first retractable member and a second retractable member linear extendable along mutually exclusive paths respectively.

3. The hand truck lifting apparatus of claim 2, wherein said means for lifting further comprises: a reversible electric winch connected to one end of said lifting cable, said reversible electric winch includes a drum assembly and a motor coupled thereto.

4. The hand truck lifting apparatus of claim 3, wherein said power distributing means comprise:
    a power supply source connected to said frame;
    a fuse electrically coupled to said power supply source;
    a raised relay and a lower relay electrically coupled to said power supply source;
    wherein said first and second control switches are electrically coupled to said lower and raised relay controls respectively;
    wherein said first control switch includes:
        a local raised pushbutton;
        a raised relay coil electrically coupled to said local raised pushbutton controls application of power to said motor;
        a local lower pushbutton; and,
        a lower relay coil electrically coupled to said local raised pushbutton controls application of power to said motor;
    wherein said second control switch includes:
        a remote raised pushbutton electrically connected in parallel to said local raised pushbutton; and,
        a remote lower pushbutton electrically connected in parallel to said local lower pushbutton;
    wherein said first and second control switches control said hand truck lifting apparatus; and,
    a series of relay contacts connected to said motor for reversing power.

5. The hand truck lifting apparatus of claim 1, wherein said frame has a center of gravity located adjacent to a bottom end thereof.

6. A method for transporting an object by employing a hand truck lifting apparatus, said method comprising the steps of:
    wheeling said hand truck lifting apparatus to a desired position, wherein said hand truck lifting apparatus includes a power means, a lifting cable, a hook, a local control switch and a remote control switch, said local and remote control switches being powered by said power means;
    extracting a first retractable member from a first outrigger assembly;
    extracting a second retractable member from a second outrigger assembly;
    adapting a tension in said lifting cable by pressing one of a local control switch and a remote control switch;
    attaching a lifting hook to the object; and, adapting the tension in said lifting cable by pressing a corresponding one of said local control switch and said remote control switch such that remaining slack in said lifting cable is removed;
    wherein said wheel system has a rotational axis disposed above said bottom carrier plate as well as above said bottom most end of said central support shaft;
    wherein said bottom carrier plate and said bottom most end of said central support shaft are prohibited from being vertically raised and lowered relative to a longitudinal length of said frame.

\* \* \* \* \*